(12) United States Patent
Yamada et al.

(10) Patent No.: US 6,873,395 B2
(45) Date of Patent: Mar. 29, 2005

(54) MOTION PICTURE ANALYZING SYSTEM (75) Inventors: Hitoshi Yamada, Wako (JP); Michinori Ichikawa, Wako (JP)

(73) Assignee: Riken, Wako (JP)

( * ) Notice: Subject to any disclaimer, the term of this patent is extended or adjusted under 35 U.S.C. 154(b) by 0 days.

(21) Appl. No.: 10/705,953

(22) Filed: Nov. 13, 2003

(65) Prior Publication Data

US 2004/0095557 A1 May 20, 2004

(30) Foreign Application Priority Data

Nov. 15, 2002 (JP) ........................................ 2002-332771

(51) Int. Cl.[7] ............................ G03B 19/18; H04N 7/01
(52) U.S. Cl. .................. 352/39; 348/407.1; 375/240.16
(58) Field of Search ...................... 352/39, 87; 348/452, 348/699; 375/240.16, 240.24, 240.26

(56) References Cited

U.S. PATENT DOCUMENTS

2004/0101053 A1 * 5/2004 Jung ...................... 375/240.16

* cited by examiner

*Primary Examiner*—Judy Nguyen
*Assistant Examiner*—Arthur A Smith
(74) *Attorney, Agent, or Firm*—Birch, Stewart, Kolasch & Birch, LLP (57) ABSTRACT

An addition image generation module 10 sequentially timewise adds images (input images) of still pictures at individual discrete time points included in a motion picture to be analyzed, thereby generating two kinds of addition images (image A and image B), respectively including images of still pictures at different discrete time points with the images being added at different ratios. Matrix development modules respectively take out pixel groups (first pixel group a(i, j) and second pixel group b(i, j)) located in a predetermined area (for example, in an area having a size of 3×3), from the generated image A and image B. A motion detection module compares the taken out first pixel group a(i, j) and second pixel group b(i, j), to detect a motion component in the motion picture to be analyzed. A movement direction detection module compares the taken out first pixel group a(i, j) and second pixel group b(i, j), while spatially shifting these groups, to detect the movement direction in the motion picture to be analyzed.

20 Claims, 6 Drawing Sheets

MOTION PICTURE ANALYZING SYSTEM

BACKGROUND OF THE INVENTION

1. Field of the Invention

The present invention relates to a motion picture analyzing system that analyzes a motion picture such as a video image, and more specifically, relates to a motion picture analyzing system, a motion picture analyzing method and a motion picture analyzing program, all of which analyze the motion of an object in a motion picture.

2. Description of Related Art

Generally, a motion picture such as a video image consists of a group of still pictures photographed at a discrete time interval (photographing interval). Conventionally, when the motion of an object in a motion picture is analyzed, a method, in which a pixel having a temporal change is extracted by comparing images of still pictures photographed at different discrete time points, is generally adopted.

With such a conventional method, however, continuous motion of an object is caught at a discrete photographing interval; thus, as the motion of the object becomes faster, it becomes difficult to find corresponding pixels by temporally comparing the images of the consecutive still pictures, and it also becomes difficult to analyze the motion of the object in a motion picture.

As a method to solve such a problem, there have been heretofore proposed: a method (1) for shortening the photographing interval to such a degree that fast movement of the object can be caught; and a method (2) for interpolating data between images of still pictures as temporally consecutive discrete data by software.

However, with the method (1), since it is necessary to reexamine the configuration of the photographing equipment basically to shorten the photographing interval, it may not be practical in view of the cost. With the method (2), since a lot of calculation time becomes necessary for the interpolation processing by the software, it is difficult to realize high-speed analysis.

SUMMARY OF THE INVENTION

The present invention has been achieved in order to solve the above problems. It is an object of the present invention to provide a motion picture analyzing system, a motion picture analyzing method and a motion picture analyzing program, which can accurately analyze the motion of an object in a motion picture at a high speed with a simple configuration even when the object is moving at a high speed.

A first aspect of the present invention is a motion picture analyzing system that analyzes a motion picture consisting of a group of still pictures photographed at a discrete time interval, which comprises: an addition image generation module that generates a first addition image and a second addition image, respectively including images of still pictures at different discrete time points with the images being added at different ratios, by sequentially timewise adding images of still pictures at individual discrete time points included in the motion picture to be analyzed; and a motion detection module that detects a motion component in the motion picture to be analyzed, by comparing with each other the first addition image and the second addition image generated by the addition image generation module.

In the first aspect of the present invention, it is preferable that the addition image generation module includes a first memory and a second memory for respectively holding the first addition image and the second addition image, and the addition image generation module generates a new first addition image to be held in the first memory by adding a fetched input image and the present first addition image held in the first memory at a first ratio, while generating a new second addition image to be held in the second memory by adding the fetched input image and the present second addition image held in the second memory at a second ratio different from the first ratio.

In the first aspect of the present invention, it is preferable that the motion detection module includes a comparator that outputs a motion component by comparing with each other, corresponding pixels of the first addition image and the second addition image.

In the first aspect of the present invention, it is preferable that the motion picture analyzing system further comprises: a first matrix development module that takes out a first pixel group located in a predetermined area, from the first addition image generated by the addition image generation module; and a second matrix development module that takes out a second pixel group located in an area corresponding to the predetermined area, from the second addition image generated by the addition image generation module; wherein the comparator in the motion detection module compares the first pixel group taken out by the first matrix development module with the second pixel group taken out by the second matrix development module, to output a motion component.

In the first aspect of the present invention, it is preferable that the motion detection module includes a counter that counts motion components outputted by the comparator, to calculate a motion quantity in the motion picture to be analyzed.

In the first aspect of the present invention, it is preferable that the motion picture analyzing system further comprises: a movement direction detection module that detects a movement direction in the motion picture to be analyzed, by comparing the first pixel group taken out by the first matrix development module with the second pixel group taken out by the second matrix development module, while spatially shifting these groups.

In the first aspect of the present invention, it is preferable that the movement direction detection module includes: a motion component output comparator that outputs a motion component by comparing a first reference pixel included in the first pixel group with a second reference pixel included in the second pixel group; a plurality of direction component output comparators that output direction components corresponding to at least four directions, by respectively comparing a plurality of pixels in the first pixel group, located at a position shifted in the respective directions from the first reference pixel, with the second reference pixel in the second pixel group; and a plurality of mask units that output movement direction components corresponding to the respective directions, by selectively outputting motion components outputted by the motion component output comparator, in accordance with the direction components corresponding to the respective directions outputted by the respective direction component output comparators.

In the first aspect of the present invention, it is preferable that the respective mask units output the motion component when the direction components corresponding to the respective directions are larger than a predetermined threshold. Moreover, it is preferable that the respective mask units output the motion component when the direction components corresponding to the respective directions and direction components in a certain relationship therewith are in an exclusive relationship.

In the first aspect of the present invention, it is preferable that the movement direction detection module further includes a counter that counts respective movement direction components outputted by the respective mask units to calculate a movement direction quantity corresponding to the respective directions.

A second aspect of the present invention is a motion picture analyzing system that analyzes a motion picture consisting of a group of still pictures photographed at a discrete time interval, which comprises: an addition image generation module that generates a first addition image and a second addition image, respectively including images of still pictures at different discrete time points with the images being added at different ratios, by sequentially timewise adding images of still pictures at individual discrete time points included in the motion picture to be analyzed; a first matrix development module that takes out a first pixel group located in a predetermined area, from the first addition image generated by the addition image generation module; a second matrix development module that takes out a second pixel group located in an area corresponding to the predetermined area, from the second addition image generated by the addition image generation module; and a movement direction detection module that detects a movement direction in the motion picture to be analyzed, by comparing the first pixel group taken out by the first matrix development module with the second pixel group taken out by the second matrix development module, while spatially shifting these groups.

In the second aspect of the present invention, it is preferable that the addition image generation module includes a first memory and a second memory for respectively holding the first addition image and the second addition image, and the addition image generation module generates a new first addition image to be held in the first memory by adding a fetched input image and the present first addition image held in the first memory at a first ratio, while generating a new second addition image to be held in the second memory by adding the fetched input image and the present second addition image held in the second memory at a second ratio different from the first ratio.

In the second aspect of the present invention, it is preferable that the movement direction detection module includes: a motion component output comparator that outputs a motion component by comparing a first reference pixel included in the first pixel group with a second reference pixel included in the second pixel group; a plurality of direction component output comparators that output direction components corresponding to at least four directions, by respectively comparing a plurality of pixels in the first pixel group, located at a position shifted in the respective directions from the first reference pixel, with the second reference pixel in the second pixel group; and a plurality of mask units that output movement direction components corresponding to the respective directions, by selectively outputting motion components outputted by the motion component output comparator, in accordance with the direction components corresponding to the respective directions outputted by the respective direction component output comparators.

In the second aspect of the present invention, it is preferable that the respective mask units output the motion component when the direction components corresponding to the respective directions are larger than a predetermined threshold. Moreover, it is preferable that the respective mask units output the motion component when the direction components corresponding to the respective directions and direction components in a certain relationship therewith are in an exclusive relationship.

In the second aspect of the present invention, it is preferable that the movement direction detection module further includes a counter that counts respective movement direction components outputted by the respective mask units to calculate a movement direction quantity corresponding to the respective directions.

A third aspect of the present invention is a motion picture analyzing method for analyzing a motion picture consisting of a group of still pictures photographed at a discrete time interval, comprising: a step of generating a first addition image and a second addition image, respectively including images of still pictures at different discrete time points with the images being added at different ratios, by sequentially timewise adding images of still pictures at individual discrete time points included in the motion picture to be analyzed; and a step of detecting a motion component in the motion picture to be analyzed, by comparing with each other the generated first addition image and the generated second addition image.

In the third aspect of the present invention, it is preferable that the method further includes: a step of taking out a first pixel group located in a predetermined area from the generated first addition image and taking out a second pixel group located in an area corresponding to the predetermined area from the second addition image; and a step of detecting a movement direction in the motion picture to be analyzed, by comparing the taken out first pixel group and the taken out second pixel group, while spatially shifting these groups.

A fourth aspect of the present invention is a motion picture analyzing program for analyzing a motion picture consisting of a group of still pictures photographed at a discrete time interval, which causes a computer to execute: a procedure of generating a first addition image and a second addition image, respectively including images of still pictures at different discrete time points with the images being added at different ratios, by sequentially timewise adding images of still pictures at individual discrete time points included in the motion picture to be analyzed; and a procedure of detecting a motion component in the motion picture to be analyzed, by comparing the generated first addition image and the generated second addition image.

In the fourth aspect of the present invention, it is preferable that the program further causes a computer to execute: a procedure of taking out a first pixel group located in a predetermined area from the generated first addition image and taking out a second pixel group located in an area corresponding to the predetermined area from the second addition image; and a procedure of detecting a movement direction in the motion picture to be analyzed, by comparing the taken out first pixel group and the taken out second pixel group, while spatially shifting these groups.

According to the present invention, after two kinds of images (a first addition image and a second addition image respectively including images of still pictures at different discrete time points at different ratios) are generated by sequentially timewise adding images of still pictures at individual discrete time points included in a motion picture to be analyzed, a motion component in the motion picture to be analyzed is detected by comparing the two kinds of images generated in this manner. Here, since the two kinds of images to be compared include events occurring at different discrete time points, the result obtained by comparing the first addition image with the second addition image is not discrete, even if the photographing interval of the still pictures is discrete. Therefore, even when the movement of an object to be photographed is fast, the motion components in the motion picture can accurately be analyzed at a high speed with a simple configuration. Particularly, a circuit which realizes such processing can easily be realized by hardware, and the two kinds of images to be compared are obtained by temporally adding a plurality of images. Therefore, the noiseproof property can be improved by the temporal averaging effect, without sacrificing time resolution.

Moreover, according to the present invention, the movement direction in the motion picture to be analyzed is detected by taking out the first pixel group located in a predetermined area from the generated first addition image, as well as taking out the second pixel group located in an area corresponding to the predetermined area from the second addition image, and then comparing the taken out first pixel group and the taken out second pixel group, while spatially shifting these groups. As a result, the movement direction in the motion picture can be analyzed with a simple configuration.

BRIEF DESCRIPTION OF THE DRAWINGS

By referring to the accompanying drawings, embodiments of the present invention will be described hereinafter. In the drawings.

DESCRIPTION OF THE PREFERRED EMBODIMENTS

At first, the overall configuration of the motion picture analyzing system according to an embodiment of the present invention will be described, with reference to FIG. 1.

Figure 1:
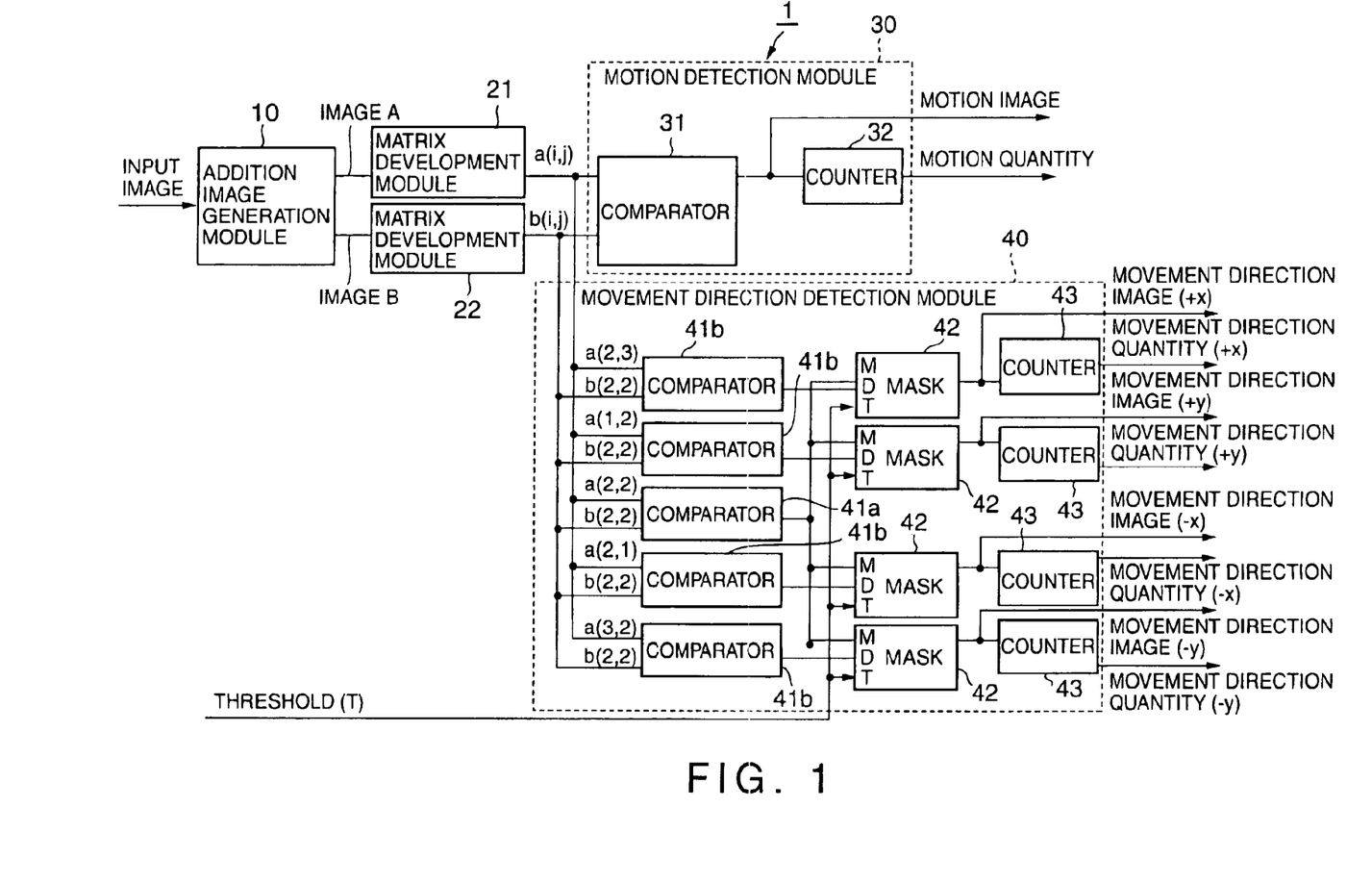
FIG. 1 is a block diagram illustrating the overall configuration of a motion picture analyzing system according to an embodiment of the present invention.

As shown in FIG. 1, the motion picture analyzing system 1 includes an addition image generation module 10, matrix development modules 21 and 22, a motion detection module 30, and a movement direction detection module 40.

Among the above modules, the addition image generation module 10 is for generating two kinds of addition images (image A and image B). The two kinds of addition images respectively includes images of still pictures at different discrete time points with the images being added at different ratios. The images (input images) of still pictures are sequentially timewise added at individual discrete time points included in the motion picture to be analyzed.

The matrix development modules 21 and 22 are for respectively taking out pixel groups (first pixel group a(i, j) and second pixel group b(i, j)) located in a predetermined region (for example, a region having a size of 3×3), from the image A and the image B generated by the addition image generation module 10.

The motion detection module 30 is for detecting a motion component in the motion picture to be analyzed, by comparing with each other the first pixel group a(i, j) and the second pixel group b(i, j), respectively taken out by the matrix development modules 21 and 22.

The movement direction detection module 40 is for detecting a movement direction in the motion picture to be analyzed, by comparing with each other the first pixel group a(i, j) and the second pixel group b(i, j), respectively taken out by the matrix development modules 21 and 22, while spatially shifting these groups.

The addition image generation module 10, the matrix development modules 21 and 22, the motion detection module 30 and the movement direction detection module 40 shown in FIG. 1 will be described in detail, with reference to FIGS. 2 to 10.

<Addition Image Generation Module>

At first, the details of the addition image generation module 10 will be described with reference to FIG. 2.

Figure 2:
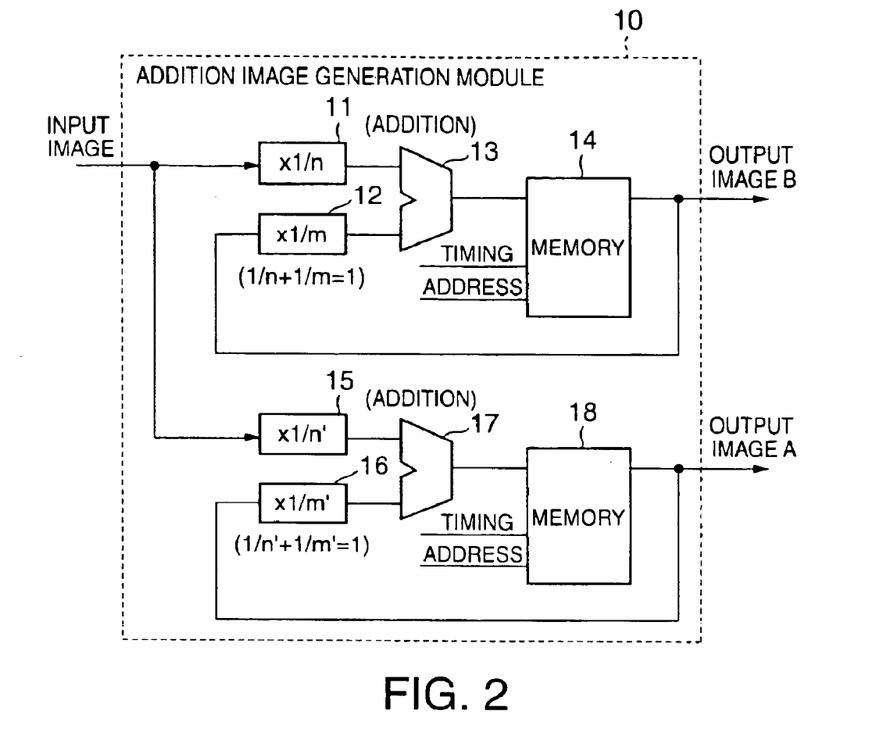
FIG. 2 is a block diagram illustrating an example of an addition image generation module in the motion picture analyzing system shown in FIG. 1.

As shown in FIG. 2, the addition image generation module 10 includes two memories 14 and 18 respectively having a capacity capable of holding an image for one still picture.

The addition image generation module 10 includes an analog multiplier 11 which multiplies an input image by (1/n), an analog multiplier 12 which multiplies an image held in the memory 14 by (1/m), and an adder 13 which adds the results outputted from the analog multipliers 11 and 12. As a result, in the addition image generation module 10, the fetched input image and the present image held in the memory 14 are added at a first ratio ((1/n) to (1/m)), and the new image obtained in this manner is stored again in the same address in the memory 14, and outputted as an image A. The initial value of the memory 14 is preferably an input image immediately before starting the addition, or an optional fixed value.

The addition image generation module 10 also includes an analog multiplier 15 which multiplies an input image by (1/n'), an analog multiplier 16 which multiplies an image held in the memory 18 by (1/m'), and an adder 17 which adds the results outputted from the analog multipliers 16 and 17. As a result, in the addition image generation module 10, the fetched input image and the present image held in the memory 18 are added at a second ratio ((1/n') to (1/m')), and the new image obtained in this manner is stored again in the same address in the memory 18, and outputted as an image B. The initial value of the memory 18 is preferably an input image immediately before starting the addition, or an optional fixed value.

The first ratio and the second ratio described above need to satisfy a relation of "1/n+1/m=1," and "1/n'+1/m'=1." Moreover, it is necessary that the first ratio and the second ratio are different from each other, for example, the ratio for the image A is (½) to (½), and the ratio for the image B is (¼) to (¾).

As a result, the image A and the image B held in the memories 14 and 18 are obtained by adding images in still pictures at different discrete time points, and when n<n', the image A includes more events close to the present than the image B. In other words, due to the difference in ratio at which the input image and the present image held in the memories 14 and 18 are added, one (for example, the image A) of the images A and B is an image reflecting the latest event, and the other (for example, the image B) is an image reflecting the former event. Therefore, by comparing these images A and B, the motion component of the motion picture can be detected.

Figure 3:
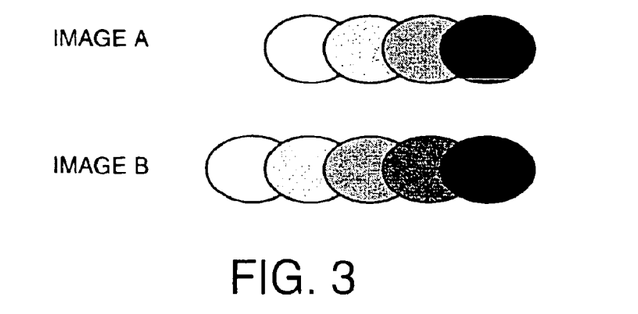
FIG. 3 is a conceptual diagram illustrating an example of addition images (image A and image B) generated by the addition image generation module in the motion picture analyzing system shown in FIG. 1.

FIG. 3 is a conceptual diagram illustrating one example of the image A and the image B obtained in this manner. In FIG. 3, both of the image A and the image B are images obtained when an elliptical object having brightness constant timewise moves from the left side to the right side (in FIG. 3, as the object becomes brighter, the color thereof is expressed darker). In the image A and the image B, the first ratio and the second ratio are in the relation of n<n', and the image A includes more events close to the present than the image B.

In the addition image generation module 10 shown in FIG. 2, the input image is multiplied by (1/n) or (1/n'), and the images held in the memories 14 and 18 are respectively multiplied by (1/m) or (1/m'), and then the both values are added. However, as in an addition image generation module 60 shown in FIG. 4, the input image is multiplied by n or n', and the images held in the memories 14 and 18 are respectively multiplied by m or m', and then the both values may be added, and multiplied by (1/(n+m)) or (1/(n'+m')) after the addition.

Figure 4:
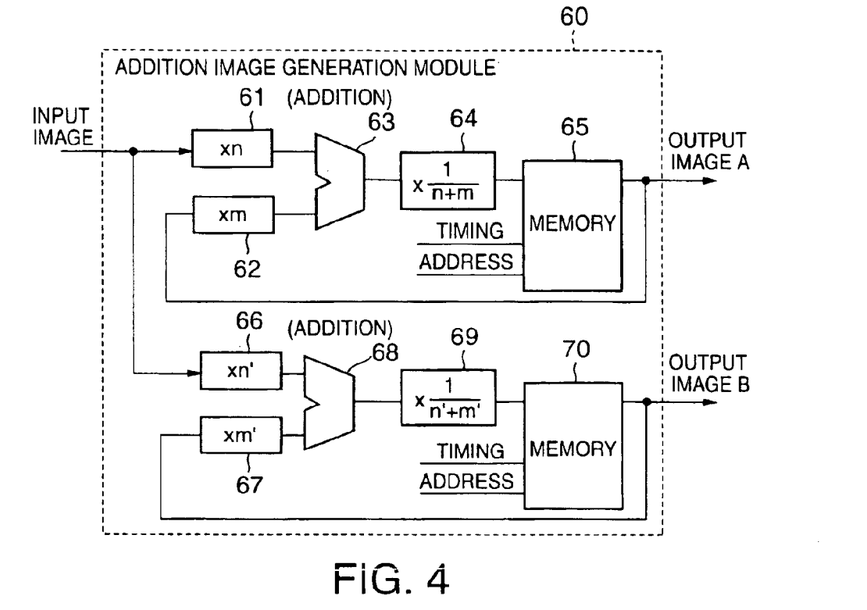
FIG. 4 is a block diagram illustrating another example of the addition image generation module in the motion picture analyzing system shown in FIG. 1.

In other words, as shown in FIG. 4, the addition image generation module 60 includes: a memory 65 having a capacity capable of holding an image for one still picture; an analog multiplier 61 which multiplies an input image by n; an analog multiplier 62 which multiplies an image held in the memory 65 by m; an adder 63 which adds the results outputted from the analog multipliers 61 and 62; and an analog multiplier 64 which multiplies the result outputted from the adder 63 by (1/(n+m)). As a result, in the addition image generation module 60, the fetched input image and the present image held in the memory 65 are added at a first ratio ((1/n) to (1/m)), and the new image obtained in this manner is stored again in the same address in the memory 65, and outputted as an image A.

Moreover, the addition image generation module 60 includes: a memory 70 having a capacity capable of holding an image for one still picture; an analog multiplier 66 which multiplies an input image by n'; an analog multiplier 67 which multiplies an image held in the memory 70 by m'; an adder 68 which adds the results outputted from the analog multipliers 66 and 67; and an analog multiplier 69 which multiplies the result outputted from the adder 68 by (1/(n'+m')). As a result, in the addition image generation module 60, the fetched input image and the present image held in the memory 70 are added at a second ratio ((1/n') to (1/m')), and the new image obtained in this manner is stored again in the same address in the memory 70, and outputted as an image B.

In the addition image generation module 60 shown in FIG. 4, it is necessary to take a sufficient bit width in the adders 63 and 68; but since there is no problem of bit dropouts due to performing division in the initial stage, more precise result can be outputted.

Here, the characteristics of the image A and the image B obtained by adding the input image and the present image will be described in more general terms, as follows.

If the information of a pixel at a time point t at the pixel position (x, y) in the image is expressed as $Y_0(x, y, t)$, the image to be held in the memory conforms to a recurrence formula in the following formula (1):

$$Y(x, y, t) = \sum_{n=k}^{t}\left\{\frac{1}{r} \times Y_0(x, y, n) + \left(1 - \frac{1}{r}\right) \times Y(x, y, n-k)\right\}, \quad (1)$$

wherein n is a discrete value which changes from k to t by 1, that is, n=k, k+1, k+2, . . . , t, and corresponds to the photographing frame number; and k is a positive real number, and represents an interval between the photographing frames. Moreover, r is a positive real number, and represents an addition ratio. Moreover, an image Y (x, y, 0) at the photographing frame number n=k is an initial value, and is an input image immediately before starting the addition, or an optional fixed value.

According to the above formula (1), if the two kinds of images (average images) are expressed as $Y_f(x, y, t)$ and $Y_s(x, y, t)$, the images to be held in the memories become as shown in the following formulas (2) and (3):

$$Y_f(x, y, t) = \sum_{n=k_f}\left\{\frac{1}{r_f} \times Y_0(x, y, n) + \left(1 - \frac{1}{r_f}\right) \times Y_f(x, y, n-k_f)\right\}, \quad (2)$$

and $$Y_s(x, y, t) = \sum_{n=k_s}\left\{\frac{1}{r_s} \times Y_0(x, y, n) + \left(1 - \frac{1}{r_s}\right) \times Y_s(x, y, n-k_s)\right\}. \quad (3)$$

Generally, either of $r_f \neq r_s$ and $k_f \neq k_s$ should be held true, or both may be held true. For example, if $r_f < r_s$ and $k_f = k_s$, $Y_f(x, y, t)$ includes more events close to the present than $Y_s(x, y, t)$. Likewise, when $r_f = r_s$ and $k_f < k_s$, the same thing applies.

Therefore, by comparing these two kinds of images, the motion component in the motion picture can easily be detected.

Moreover, by comparing these two kinds of images, while spatially shifting these groups, that is, by comparing $Y_f(x+\Delta x, y+\Delta y, t)$ with $Y_s(x, y, t)$, the movement direction in the motion picture can be detected.

In the above description, in the addition image generation modules 10 and 60, the two kinds of images (the image A and the image B) include images of the still pictures at different discrete time points at different ratios, by changing the ratio of adding the input image to the present images respectively held in the memories 14 and 18 and the memories 65 and 70. However, not being limited thereto, the two kinds of images (the image A and the image B) may include images of the still pictures at different discrete time points at different ratios, by changing a frame in which the input image is added to the present images respectively held in the memories 14 and 18 and the memories 65 and 70. The latter case corresponds to k≠ 0 in the above formula (1), and $k_f \neq 0$ and $k_s \neq 0$ in the formulas (2) and (3).

<Matrix Development Module>

The details of the matrix development modules 21 and 22 will be described with reference to FIG. 5. Here, an example in which a pixel group located in an area (window area) having a size of 3×3 is taken out from the image will be described.

Figure 5:
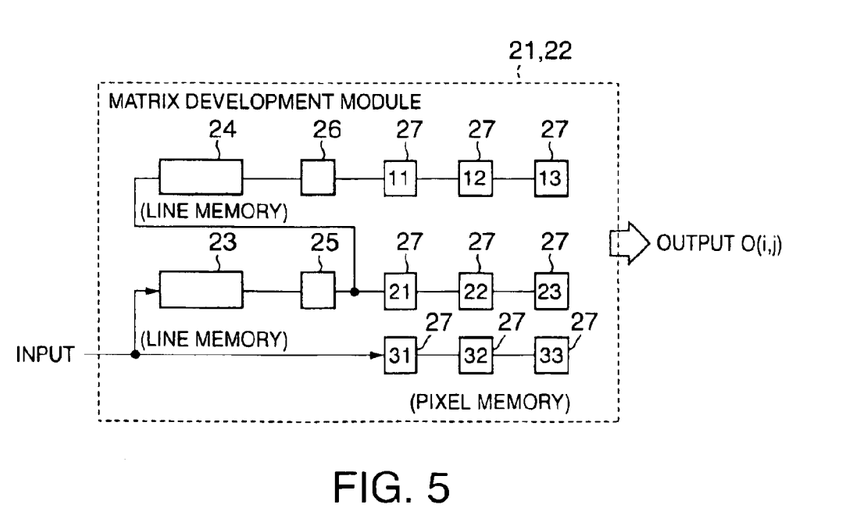
FIG. 5 is a block diagram illustrating an example of a matrix development module in the motion picture analyzing system shown in FIG. 1.

As shown in FIG. 5, the matrix development modules 21 and 22 respectively include line memories 23 and 24 in the horizontal direction, and eleven memories 25, 26 and 27 for holding the information for one pixel. In such matrix development modules 21 and 22, the information inputted from the addition image generation module 10 in a unit of pixel is sequentially stored in the line memories 23 and 24 and the memories 25 and 26, and sequentially outputted to the 9×9 memories (pixel memories) 27 by line. As a result, the information of 3×3 pixels in an arbitrary area in the image is stored in the nine pixel memories at all times, and is outputted as 3×3 matrices O(i, j) (the first pixel group a(i, j) or the second pixel group b(i, j)).

The first pixel group a(i, j) and the second pixel group b(i, j) taken out by the matrix development modules 21 and 22 are inputted to the motion detection module 30 and the movement direction detection module 40.

<Movement Direction Detection Module>

As shown in FIG. 1, the motion detection module 30 includes a comparator 31 which compares with each other, corresponding pixels of the image A and the image B and outputs the motion component.

Figure 6:
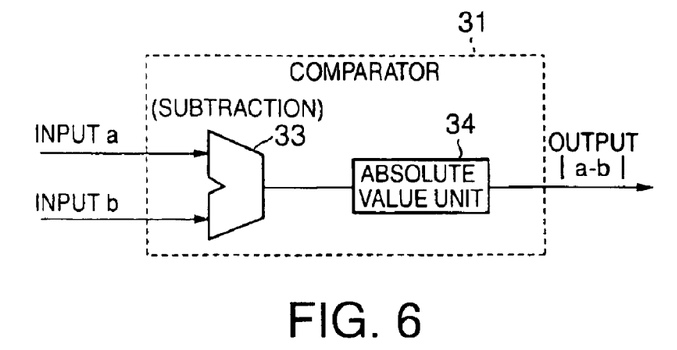
FIG. 6 is a block diagram illustrating an example of a comparator included in the motion detection module in the motion picture analyzing system shown in FIG. 1.

As the comparator 31, as shown in FIG. 6, a comparator which compares arbitrary pixels of the first pixel group a(i, j) and the second pixel group b(i, j) taken out by the matrix development modules 21 and 22 can be used.

As shown in FIG. 6, the comparator 31 includes a subtracter 33 which takes a difference between the input scalar quantities a and b, and an absolute value unit 34 which takes an absolute value in the result outputted from the subtracter 33. As a result, in the comparator 31, a difference in the pixel information inputted as the scalar quantities a and b (for example, a(2, 2) and b(2, 2) located at the center of the first pixel group a(i, j) and the second pixel group b(i, j)) is taken, and the absolute value is outputted as the comparison result.

The comparison result outputted from the comparator 31 represents a temporal change (motion component) of corresponding pixels of the image A and the image B. Therefore, an image obtained by extracting only the motion component in the motion picture (a motion image) can be obtained based on the comparison result.

In the comparator 31 shown in FIG. 6, the comparison result is outputted based on the optional pixel information (for example, a(2, 2) and b(2, 2) located at the center of the pixel groups). However, the comparison result may be outputted based on the whole pixel information of the first pixel group a(i, j) and the second pixel group b(i, j) located in 3×3 window areas.

Figure 7:
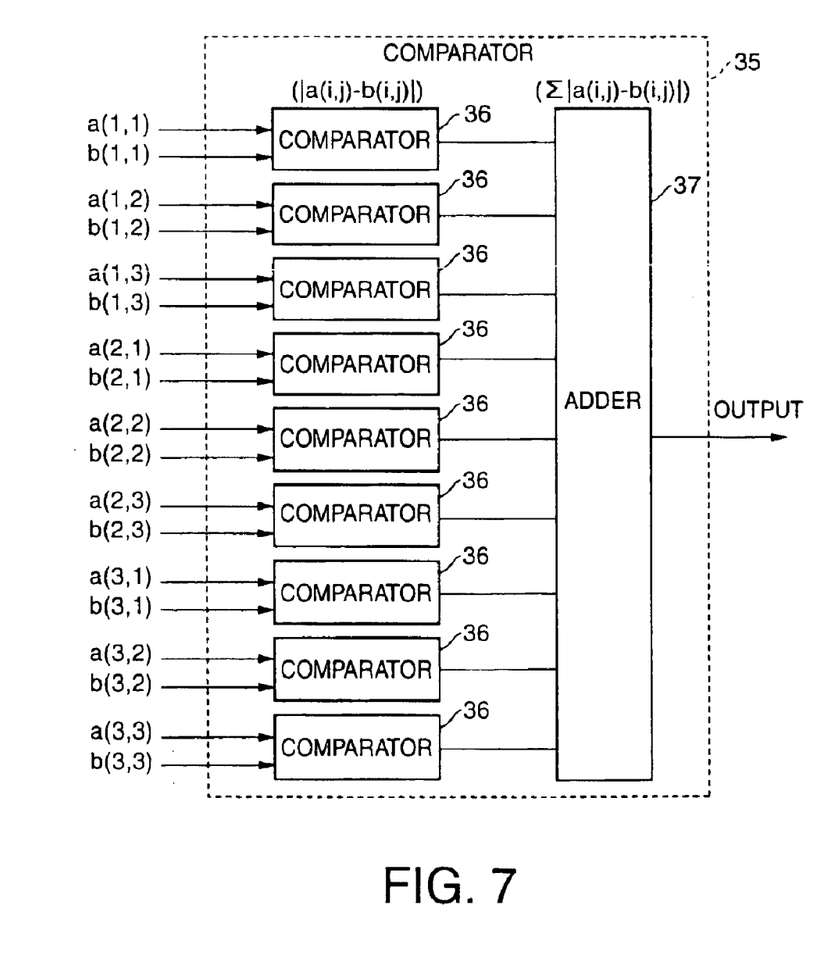
FIG. 7 is a block diagram illustrating another example of the comparator included in the motion detection module in the motion picture analyzing system shown in FIG. 1.

In other words, as shown in FIG. 7, the comparator 35 includes nine scalar quantity comparators 36 which take a difference between corresponding elements (elements with the same subscript) included in the input 3×3 matrix quantities a(i, j) and b(i, j), and an adder 37 which takes the sum of the results outputted from the scalar quantity comparators 36. The comparator 31 shown in FIG. 6 can be used for the scalar quantity comparator 36. As a result, the comparator 35 takes a difference between nine elements (a(i, j) and b(i, j)) having the same subscript, and outputs the sum of the absolute values as the comparison result. The comparator 35 shown in FIG. 7 simply calculates a difference between a(i, j) and b(i, j), but correlation between a(i, j) and b(i, j) may be calculated by an existing optional method.

The motion detection module 30 is provided with a counter 32 which counts the output result (motion component) outputted from the comparator 31. By adding up a temporal change (motion component) of each pixel over a part or all of the image by the counter 32, a local or overall motion quantity in the motion picture can be obtained.

<Movement Direction Detection Module>

As shown in FIG. 1, the movement direction detection module 40 includes a motion component output comparator 41a that compares a(2, 2) located at the center of the first pixel group a(i, j) with b(2, 2) located at the center of the second pixel group b(i, j) to output a motion component (M), and a plurality of direction component output comparators 41b that respectively compares a plurality of pixels (a(2, 3), a(1, 2), a(2, 1), a(3, 2)) located at a position shifted in four directions (+x, +y, −x, −y) from a(2, 2) of the first group a(i, j) with b(2, 2) in the second pixel group b(i, j) to output direction components (D) corresponding to the respective directions.

The movement direction detection module 40 also includes a plurality of mask units 42 that selectively outputs the motion component (M) outputted by the motion component output comparator 41a in accordance with the direction components (D) corresponding to the respective directions outputted by the respective direction component output comparators 41b, thereby outputting movement direction components corresponding to the respective directions (+x, +y, −x, −y).

Figure 8:
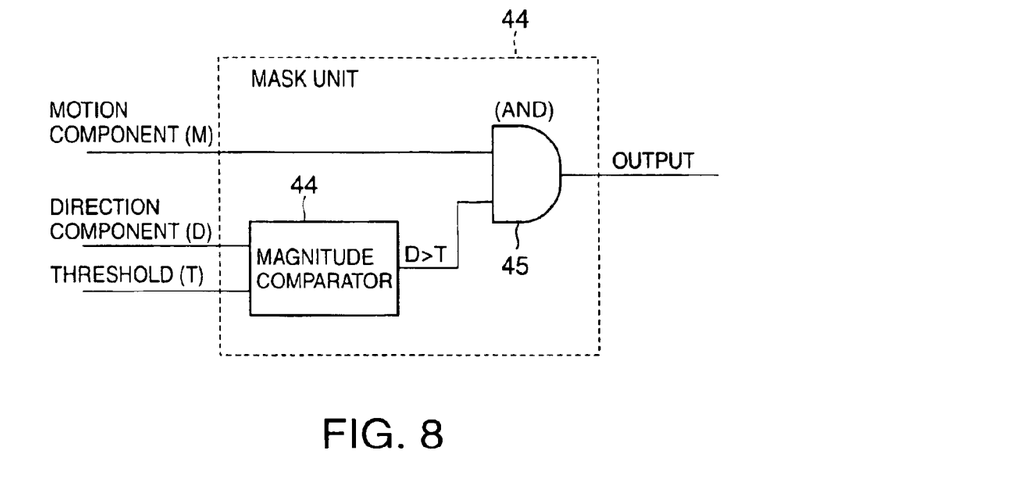
FIG. 8 is a block diagram illustrating an example of a mask unit included in the motion detection module in the motion picture analyzing system shown in FIG. 1.

FIG. 8 is a diagram showing such mask units 42. As shown in FIG. 8, the respective mask units 42 include a magnitude comparator 44 that compares the magnitudes of the direction components (D) and a threshold (T), and when D>T, outputs "1", and when D≦T, outputs "0". The respective mask units 42 also include an AND circuit 45 that takes a logical product of the motion component (M) and the output result of the magnitude comparator 44. As a result, the respective mask units 42 output the motion component (M) when the direction components (D) corresponding to the respective directions are larger than the predetermined threshold (T), and output "0" otherwise. The results outputted from the respective mask units 42 represent a motion component (movement direction component) of a pixel moving only in one direction of (+x, +y, −x, −y). Therefore, based on the results, an image that extracts a motion component of a motion picture moving only in a specific direction (a movement direction image) can be obtained.

The mask units 42 shown in FIG. 8 selectively output the motion component (M) based on only one direction component (D). However, the mask units 42 may selectively output the motion component (M) based on more than two direction components (D, D'), as shown in FIG. 9.

Figure 9:
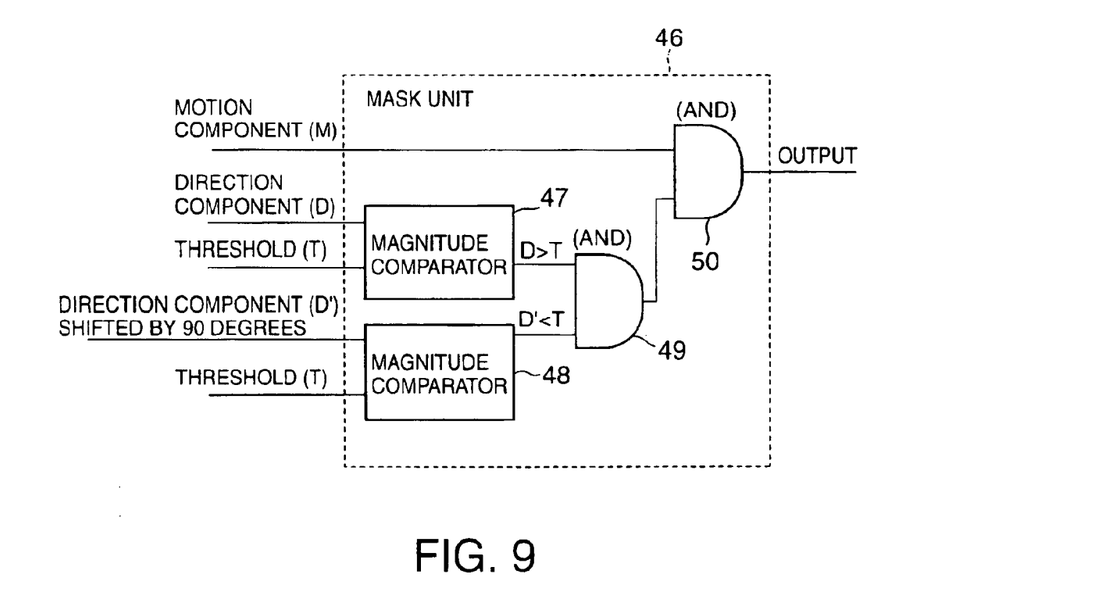
FIG. 9 is a block diagram illustrating another example of a mask unit included in the motion detection module in the motion picture analyzing system shown in FIG. 1.

In other words, as shown in FIG. 9, the respective mask units 46 include a magnitude comparator 47 that compares the magnitude of the direction components (D) and a threshold (T), and when D>T, outputs "1", and when D≦T, outputs "0". The respective mask units 46 also include a magnitude comparator 48 that compares the magnitude of the direction components (D') in a direction shifted by 90 degrees from the direction of the direction components (D) with the threshold (T), and when D'<T, outputs "1", and when D'≧T, outputs "0". The respective mask unit 46 further include an AND circuit 49 that takes a logical product of the output result of the magnitude comparator 47 and the output result of the magnitude comparator 48, and an AND circuit 50 that takes a logical product of the motion component (M) and the output result of the AND circuit 49. As a result, the respective mask units 46 output the motion component (M) when the direction component (D) corresponding to the respective directions (for example, +x) and the direction component (D') in a certain relationship therewith (a direction shifted by 90 degrees (for example, +y) are in an exclusive relationship, and output "0" otherwise.

Figure 10:
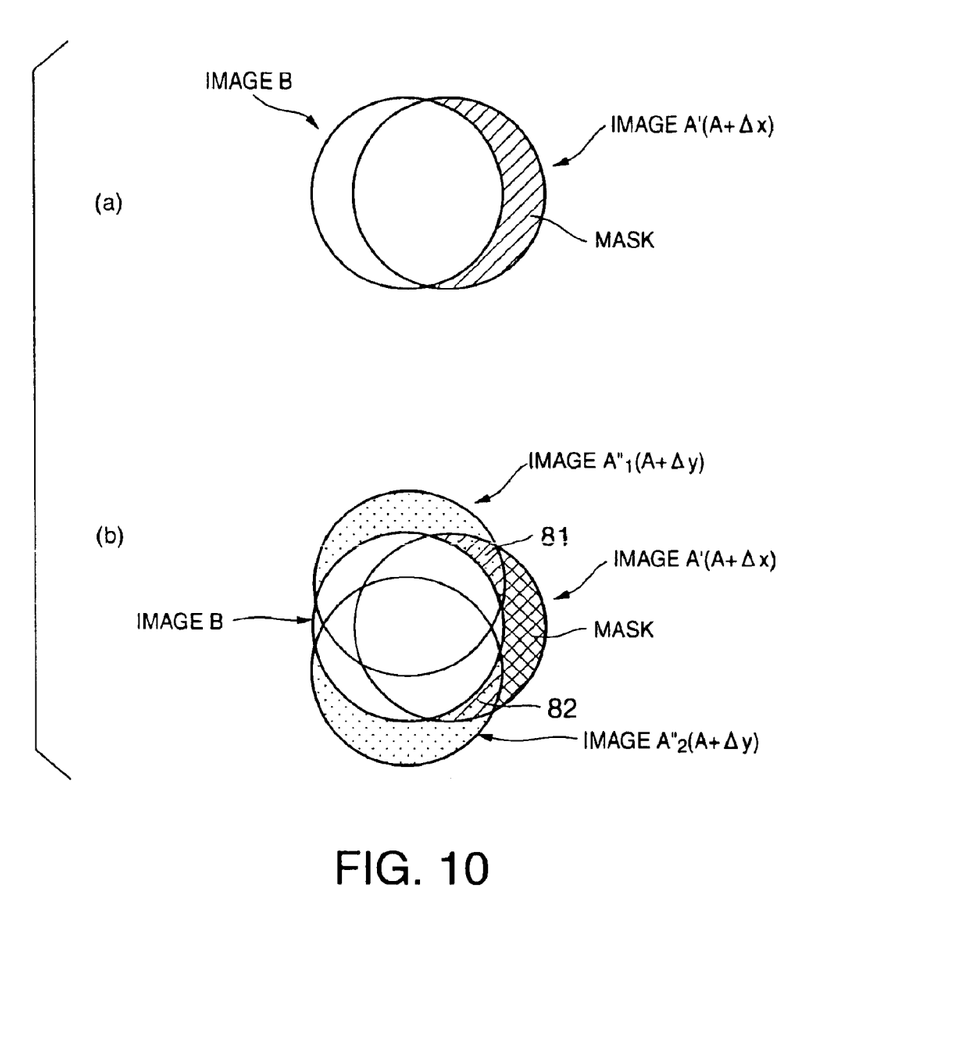
FIG. 10 is a conceptual diagram for explaining the function of the mask unit shown in FIGS. 8 and 9.

Here, explanation is given to a case where a motion component (movement direction component) of a pixel moving only in a specific direction (for example, +x direction) is extracted. In the mask units 44 shown in FIG. 8, as shown in FIG. 10(*a*), a portion (shaded portion) corresponding to a difference between an image A' (an image obtained by shifting the image A by Δx) and the image B is designated as a selective output portion (mask corresponding portion), and only a motion component (M) in this portion is selectively outputted. On the other hand, in the mask unit 46 shown in FIG. 9, as shown in FIG. 10(*b*), a portion (cross-hatching portion) obtained by subtracting a portion (dot portion) corresponding to a difference between an image $A_1''$ or an image $A_2''$ (an image obtained by shifting the image A by Δy or −Δy) and the image B, from a portion (shaded portion) corresponding to a difference between the image A'(an image obtained by shifting the image A by Δx) and the image B is designated as a selective output portion (mask corresponding portion), and only a motion component (M) in this portion is selectively outputted.

Generally, when a diagonal direction component is included in the shape (external shape) of an object, even when the object is actually moving in the +x direction, a motion component in the ±y direction appears. In other words, in FIG. 10(*b*), in a portion (see reference symbols 81 and 82) overlapping on a portion (dot portion) corresponding to a difference between the image $A_1''$ (or an image $A_2''$) obtained by shifting the image A by Δy (or −Δy) and the image B, of the portion (shaded portion) corresponding to a difference between the image A' (an image obtained by shifting the image A by Δx) and the image B, even when the object moves in the +x direction or in the ±y direction, the motion component (M) appears. In the mask unit 46 shown in FIG. 9, however, since these portions can be excluded from the selective output portion (mask corresponding portion), a motion component (movement direction component) of the pixel moving only in a specific direction (for example, +x direction) can accurately and reliably be extracted, regardless of the object shape.

In the movement direction detection module 40, a plurality of counters 43 that counts the output results (movement direction components) outputted by the respective mask units 42 for each direction (+x, +y, −x, −y) is provided. By adding up the movement direction components of the respective pixels for each direction (+x, +y, −x, −y) over a part or all of the image by the counters 43, a local or overall movement direction quantity in the motion picture corresponding to each direction (+x, +y, −x, −y) can be obtained.

Here, by using the movement direction quantities in four directions (+x, +y, −x, −y), the movement direction in the motion picture can be caught in an optional direction. In other words, when either one of the +x movement direction quantity and the −x movement direction quantity, having a larger absolute value, is designated as X, and either one of the +y movement direction quantity and the −y movement direction quantity, having a larger absolute value, is designated as Y, to create a vector (X, Y), the angle Θ representing the movement direction in the motion picture is expressed as:

$$\Theta = \tan^{-1}(Y/X).$$

According to the embodiment, after two kinds of images (the image A and the image B respectively including images of still pictures at different discrete times at different ratios) are generated by sequentially timewise adding images of still pictures at individual discrete time points included in a motion picture to be analyzed by the addition image generation module 10, a motion component in the motion picture to be analyzed is detected by comparing the two kinds of images (the image A and the image B) generated in this manner by the motion detection module 30. Here, since the two kinds of images (the image A and the image B) to be compared include events occurring at different discrete time points, the result obtained by comparing the image A with the image B is not discrete, even if the photographing interval of the still pictures is discrete. Therefore, even when the movement of an object to be photographed is fast, the motion components in the motion picture can accurately be analyzed at a high speed with a simple configuration. Particularly, a circuit which realizes such processing can easily be realized by hardware, and the two kinds of images (the image A and the image B) to be compared are obtained by temporally adding a plurality of images. Therefore, the noiseproof property can be improved by the temporal averaging effect, without sacrificing time resolution.

Moreover, according to the embodiment, after the first pixel group a(i, j) located in a 3×3 window area is taken out from the image A generated by the addition image generation module 10, and the second pixel group b(i, j) located in an area corresponding to the window area is taken out from the image B by the addition image generation module 10, by using the matrix development modules 21 and 22, the taken out first pixel group a(i, j) and the taken out second pixel group b(i, j) are compared by the movement direction detection module 40, while spatially shifting these groups, thereby detecting a movement direction in the motion picture to be analyzed. As a result, the movement direction in the motion picture can be analyzed with a simple configuration.

The movement direction in the motion picture obtained in this manner can be used in various kinds of control systems such as a robot.

In the embodiment, the comparator 31 in the motion detection module 30 compares with each other the first pixel group a(i, j) and the second pixel group b(i, j) taken out by the matrix development modules 21 and 22 to detect the motion component in the motion picture to be analyzed. However, when optional pixels in the first pixel group a(i, j) and the second pixel group b(i, j) are compared, the corresponding pixels in the image A and the image B outputted from the addition image generation module 10 may be directly compared, without using the matrix development modules 21 and 22.

In the embodiment, in the movement direction detection module 40, the direction components (D) obtained by taking an absolute value of a difference between the spatially shifted image A and image B is used in the respective mask units 42. However, not limited thereto, one obtained by appropriately calculating the direction components (D) may be used in the respective mask units 42.

Moreover, in the embodiment, in the movement direction detection module 40, the motion component output comparator 41*a* and the mask units 42 are used in addition to the respective direction component output comparators 41*b* as the means for selectively outputting the motion component (M). However, if the movement direction quantity and the angle Θ representing only the movement need to be obtained, only the direction component output comparators 41*b* that output the direction components (D) corresponding to the respective directions are necessary. In this case, the motion component output comparator 41a and the mask units 42 are not necessary.

In the embodiment, the addition image generation module 10, the matrix development modules 21 and 22, the motion detection module 30 and the movement direction detection module 40 can be realized as a program operated on a computer. Such a program is stored in a computer readable recording medium such as a memory on a computer, a hard disk, a flexible disk, or a CD-ROM, and sequentially read out from the CPU (Central Processing Unit) on the computer and executed, to realize the above-described functions.

What is claimed is:

1. A motion picture analyzing system that analyzes a motion picture consisting of a group of still pictures photographed at a discrete time interval, comprising:

an addition image generation module that generates a first addition image and a second addition image, respectively including images of still pictures at different discrete time points with the images being added at different ratios, by sequentially timewise adding images of still pictures at individual discrete time points included in the motion picture to be analyzed; and a motion detection module that detects a motion component in the motion picture to be analyzed, by comparing with each other said first addition image and said second addition image generated by said addition image generation module.

2. A motion picture analyzing system according to claim 1, wherein said addition image generation module includes a first memory and a second memory for respectively holding said first addition image and said second addition image, and said addition image generation module generates a new first addition image to be held in said first memory by adding a fetched input image and the present first addition image held in said first memory at a first ratio, while generating a new second addition image to be held in said second memory by adding said fetched input image and the present second addition image held in said second memory at a second ratio different from said first ratio.

3. A motion picture analyzing system according to claim 1, wherein said motion detection module includes a comparator that outputs a motion component by comparing with each other, corresponding pixels of said first addition image and said second addition image.

4. A motion picture analyzing system according to claim 3, further comprising:

a first matrix development module that takes out a first pixel group located in a predetermined area, from said first addition image generated by said addition image generation module; and a second matrix development module that takes out a second pixel group located in an area corresponding to said predetermined area, from said second addition image generated by said addition image generation module;

wherein said comparator in said motion detection module compares said first pixel group taken out by said first matrix development module with said second pixel group taken out by said second matrix development module, to output a motion component.

5. A motion picture analyzing system according to claim 3, wherein said motion detection module includes a counter that counts motion components outputted by said comparator, to calculate a motion quantity in the motion picture to be analyzed.

6. A motion picture analyzing system according to claim 4, further comprising: a movement direction detection module that detects a movement direction in the motion picture to be analyzed, by comparing said first pixel group taken out by said first matrix development module with said second pixel group taken out by said second matrix development module, while spatially shifting these groups.

7. A motion picture analyzing system according to claim 6, wherein said movement direction detection module includes:

a motion component output comparator that outputs a motion component by comparing a first reference pixel included in said first pixel group with a second reference pixel included in said second pixel group;

a plurality of direction component output comparators that output direction components corresponding to at least four directions, by respectively comparing a plurality of pixels in said first pixel group, located at a position shifted in said respective directions from said first reference pixel, with said second reference pixel in said second pixel group; and a plurality of mask units that output movement direction components corresponding to said respective directions, by selectively outputting motion components outputted by said motion component output comparator, in accordance with the direction components corresponding to said respective directions outputted by said respective direction component output comparators.

8. A motion picture analyzing system according to claim 7, wherein said respective mask units output said motion component when the direction components corresponding to said respective directions are larger than a predetermined threshold.

9. A motion picture analyzing system according to claim 7, wherein said respective mask units output said motion component when the direction components corresponding to said respective directions and direction components in a certain relationship therewith are in an exclusive relationship.

10. A motion picture analyzing system according to claim 7, wherein said movement direction detection module further includes a counter that counts respective movement direction components outputted by said respective mask units to calculate a movement direction quantity corresponding to said respective directions.

11. A motion picture analyzing system that analyzes a motion picture consisting of a group of still pictures photographed at a discrete time interval, comprising:

an addition image generation module that generates a first addition image and a second addition image, respectively including images of still pictures at different discrete time points with the images being added at different ratios, by sequentially timewise adding images of still pictures at individual discrete time points included in the motion picture to be analyzed;

a first matrix development module that takes out a first pixel group located in a predetermined area, from said first addition image generated by said addition image generation module;

a second matrix development module that takes out a second pixel group located in an area corresponding to said predetermined area, from said second addition image generated by said addition image generation module; and a movement direction detection module that detects a movement direction in the motion picture to be analyzed, by comparing said first pixel group taken out by said first matrix development module with said second pixel group taken out by said second matrix development module, while spatially shifting these groups.

12. A motion picture analyzing system according to claim 11, wherein said addition image generation module includes a first memory and a second memory for respectively holding said first addition image and said second addition image, and said addition image generation module generates a new first addition image to be held in said first memory by adding a fetched input image and the present first addition image held in said first memory at a first ratio, while generating a new second addition image to be held in said second memory by adding said fetched input image and the present second addition image held in said second memory at a second ratio different from said first ratio.

13. A motion picture analyzing system according to claim 11, wherein said movement direction detection module includes:

a motion component output comparator that outputs a motion component by comparing a first reference pixel included in said first pixel group with a second reference pixel included in said second pixel group;

a plurality of direction component output comparators that output direction components corresponding to at least four directions, by respectively comparing a plurality of pixels in said first pixel group, located at a position shifted in said respective directions from said first reference pixel, with said second reference pixel in said second pixel group; and a plurality of mask units that output movement direction components corresponding to said respective directions, by selectively outputting motion components outputted by said motion component output comparator, in accordance with the direction components corresponding to said respective directions outputted by said respective direction component output comparators.

14. A motion picture analyzing system according to claim 13, wherein said respective mask units output said motion component when the direction components corresponding to said respective directions are larger than a predetermined threshold.

15. A motion picture analyzing system according to claim 13, wherein said respective mask units output said motion component when the direction components corresponding to said respective directions and direction components in a certain relationship therewith are in an exclusive relationship.

16. A motion picture analyzing system according claim 13, wherein said movement direction detection module further includes a counter that counts respective movement direction components outputted by said respective mask units to calculate a movement direction quantity corresponding to said respective directions.

17. A motion picture analyzing method for analyzing a motion picture consisting of a group of still pictures photographed at a discrete time interval, comprising:

a step of generating a first addition image and a second addition image, respectively including images of still pictures at different discrete time points with the images being added at different ratios, by sequentially timewise adding images of still pictures at individual discrete time points included in the motion picture to be analyzed; and a step of detecting a motion component in the motion picture to be analyzed, by comparing with each other said generated first addition image and said generated second addition image.

18. A motion picture analyzing method according to claim 17, further comprising:

a step of taking out a first pixel group located in a predetermined area from said generated first addition image and taking out a second pixel group located in an area corresponding to said predetermined area from said second addition image; and a step of detecting a movement direction in the motion picture to be analyzed, by comparing said taken out first pixel group and said taken out second pixel group, while spatially shifting these groups.

19. A motion picture analyzing program for analyzing a motion picture consisting of a group of still pictures photographed at a discrete time interval, which causes a computer to execute:

a procedure of generating a first addition image and a second addition image, respectively including images of still pictures at different discrete time points with the images being added at different ratios, by sequentially timewise adding images of still pictures at individual discrete time points included in the motion picture to be analyzed; and a procedure of detecting a motion component in the motion picture to be analyzed, by comparing said generated first addition image and said generated second addition image.

20. A motion picture analyzing program according to claim 19, which further causes the computer to execute:

a procedure of taking out a first pixel group located in a predetermined area from said generated first addition image and taking out a second pixel group located in an area corresponding to said predetermined area from said second addition image; and a procedure of detecting a movement direction in the motion picture to be analyzed, by comparing said taken out first pixel group and said taken out second pixel group, while spatially shifting these groups.

* * * * *